Dec. 27, 1960 N. GREEN 2,966,596

MAGNETIC FLIP-FLOP DEVICES

Filed May 16, 1958 2 Sheets-Sheet 1

INVENTOR.
Norman Green
BY
Ooms, McDougall, Williams & Hersh
ATTorneys

Dec. 27, 1960 N. GREEN 2,966,596

MAGNETIC FLIP-FLOP DEVICES

Filed May 16, 1958 2 Sheets-Sheet 2

INVENTOR.
Norman Green

BY

Ooms, McDougall, Williams & Hersh
Attorneys 2,966,596
Patented Dec. 27, 1960

2,966,596

MAGNETIC FLIP-FLOP DEVICES

Norman Green, Donelson, Tenn., assignor to Aladdin Industries Incorporated, Nashville, Tenn., a corporation of Illinois Filed May 16, 1958, Ser. No. 735,899

3 Claims. (Cl. 307—88)

This invention relates to frequency dividers, often referred to as flip-flops.

One object of the present invention is to provide a new and improved flip-flop device utilizing magnetic transformers as some of the main circuit elements.

A further object is to provide such a new and improved flip-flop which utilizes the bi-stable magnetic characteristic of a transformer core in producing frequency division of pulse-type input signals.

Another object is to provide a new and improved flip-flop device of the foregoing character which requires no supply of either direct or alternating current power.

It is a further object to provide a new and improved magnetic flip-flop which does not require any vacuum tubes, transistors or the like.

Another object is to provide a new and improved magnetic flip-flop which does not require any external magnetic biasing flux.

A further object is to provide a new and improved magnetic flip-flop which functions with only one source of input pulses applied to a single pair of input terminals.

Still another object is to provide a new and improved flip-flop device which is extremely sturdy, reliable, compact and economical.

Further objects and advantages of the present invention will appear from the following description, taken with the accompanying drawings, in which.

Figure 1:
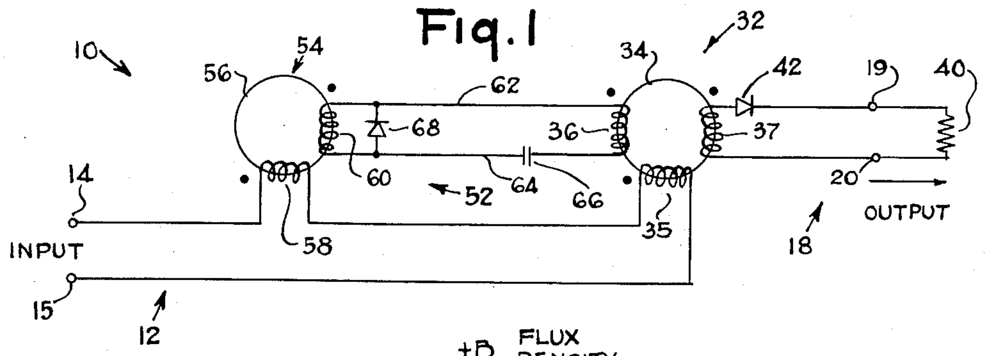
Fig. 1 is a schematic diagram showing a magnetic flip-flop device to be described as one illustrative embodiment of the present invention.

As already indicated, Fig. 1 illustrates a magnetic flip-flop 10 adapted to perform a frequency dividing operation with respect to pulse-type input signals. In this case, the flip-flop 10 has an input circuit 12 with a single pair of input terminals 14 and 15. Similarly, the flip-flop 10 has a single output circuit 18 with a pair of output terminals 19 and 20. As will be explained shortly, the flip-flop 10 may readily be provided with more than one output circuit, if desired.

Figure 4:
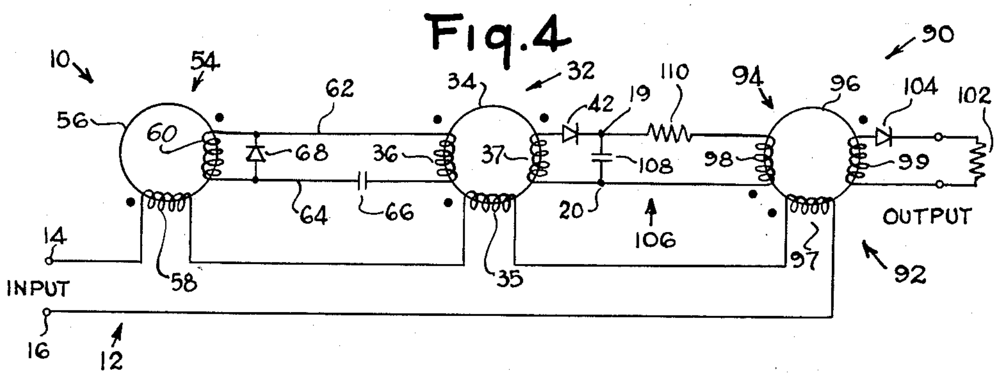
Fig. 4 is a schematic diagram showing a magnetic flip-flop device constituting another illustrative embodiment of the invention.
Figure 5:
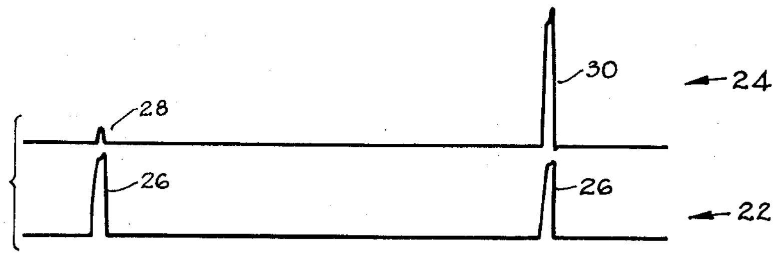
Fig. 5 illustrates oscillograms showing typical waveforms of the input and output pulses with respect to the magnetic flip-flop of Fig. 4.

A preview of the function and purpose of the flip-flop 10 may best be presented by considering Fig. 5, which illustrates input and output oscillograms 22 and 24. Actually, Fig. 5 pertains more particularly to the embodiment of Fig. 4, but is also reasonably typical of the embodiment of Fig. 1. It will be seen that the input oscillogram 22 displays regularly spaced, repetitive, substantially unidirectional input pulses 26, which are of relatively short duration, with respect to the interval therebetween. The output oscillogram 24 illustrates output pulses 28 and 30 which are alternately of small and large amplitudes. The ratio between the amplitudes may be quite great, in the order of 10 to 1, and the volt-time integral ratios may be even greater, in the order of 50 to 1. These figures apply particularly to the somewhat elaborated form of the invention shown in Fig. 4, but are also reasonably typical of the embodiment of Fig. 1. It will be obvious that the output pulses have a large component at one-half the frequency of the input pulses. For most purposes, the small output pulses 28 are virtually negligible, so that the output pulses can be considered to have one-half the frequency of the input pulses.

Figure 2:
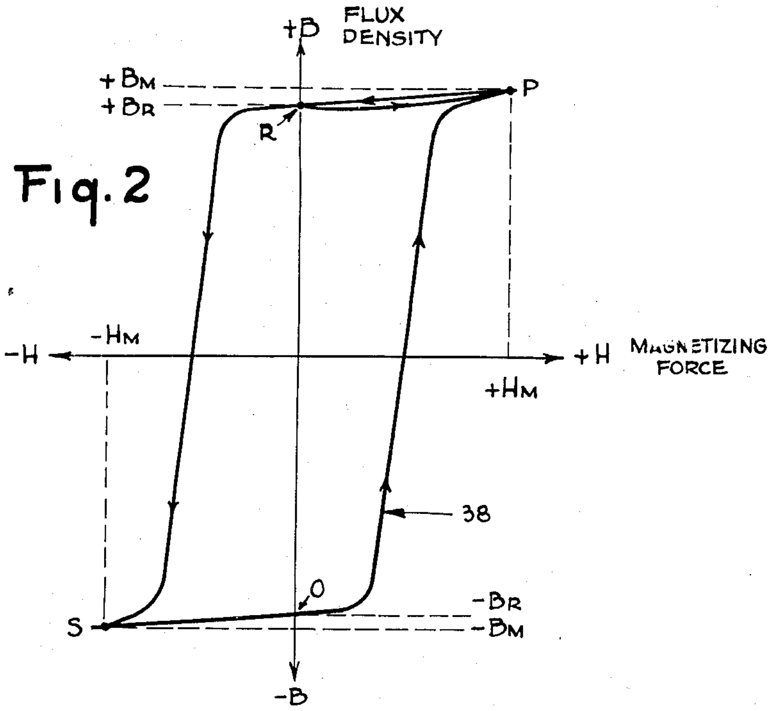
Fig. 2 is a graph showing the nearly rectangular hysteresis loop with respect to the core of one transformer employed in the device of Fig. 1.

One important component of the magnetic flip-flop 10 is a pulse transformer 32 having a magnetic core 34 of a bi-stable magnetic material, exhibiting a nearly rectangular magnetic hysteresis loop, exemplified by the graph of Fig. 2. The core 34 preferably takes the form of a substantially closed magnetic circuit. In this case, the transformer 32 has two input windings 35 and 36, and one output winding or coil 37, which feeds the output circuit 18. One or more additional output coils may readily be wound on the core 34 if more than one output circuit is desired. It will be understood that all of the coils 35, 36 and 37 are wound on the core so as to link the magnetic flux therein.

As already indicated, the graph of Fig. 2 exemplifies the magnetic characteristics of the bistable core 34. It will be seen that the core is of a highly retentive magnetic material, exhibiting a nearly rectangular hysteresis loop 38. For conditions in which the magnetizing force varies between negative and positive maximum values represented by $-H_M$ and $+H_M$, the magnetic flux will vary between negative and positive values represented by $-B_M$ and $+B_M$. It will be seen that the core is approaching saturation at the maximum flux values. It will be seen that the negative and positive maximum flux values on the hysteresis loop are represented by the letters S and P.

Under the conditions represented by Fig. 2, the core 34 will be in either of two remanent states, in the absence of magnetizing force. The negative and positive remanent states are represented by points designated O and R in Fig. 2. It will be seen that the negative and positive remanent flux values $-B_R$ and $+B_R$ are nearly as great as the corresponding maximum flux values $-B_M$ and $+B_M$.

It may be assumed that the core 34 is initially at the negative remanent point O. If a positive magnetizing force $+H_M$ is applied, the core will traverse the portion of the hysteresis loop 38 between the points O and P, in the direction represented by the arrows in Fig. 2. If the magnetizing force $+H_M$ is then removed, the core will traverse the portion of the hysteresis loop between the points P and R, and thus will arrive at the positive remanent point. Similarly, application of a negative magnetizing force $-H_M$ will shift the core to the negative maximum point S, while removal of the negative magnetizing force will cause the core to traverse the hysteresis loop to the negative remanent point O. The ability of the core to shift between negative and positive states of remanent magnetic stability is utilized to good advantage in the flip-flop of Fig. 1.

From Fig. 1 it will be apparent that the illustrated input circuit 12 is a series-connected arrangement across the input terminals 14 and 15. The input winding 35 is part of the series-connected input circuit 12. It may be assumed that repetitive unidirectional input pulses are applied between the input terminals 14 and 15. The pulses are such that the current in the input winding 35 is of the general waveform illustrated in the oscillogram 22 of Fig. 5. The input pulses 26 are made of sufficient magnitude to shift the core 34 in one direction between its two remanent states of stability. For the sake of simplicity and clarity of presentation, it will be assumed that the polarity of the input pulses 26 is such as to shift the core 34 between its negative and positive remanent states, but it will be understood that the flip-flop might be arranged so that the input pulses would shift the core in the other direction.

It will be apparent that the first input pulse will shift the core from its negative to its positive remanent state. Subsequent pulses will find the core in its positive remanent state and thus will be ineffective to shift the core, unless the core has been reset to its negative remanent state. To reset the core, provision is made for developing reset pulses which are applied to the second input coil 36. The reset pulses are gated so that they occur only for alternate input pulses. Thus, one input pulse shifts the core between its negative and positive remanent states. Through the gating arrangement, the next input pulse has the indirect effect of shifting the core between its positive and negative remanent states. As a result, two complete cycles of the input pulses are required to complete one cycle of the magnetic flux in the core.

In the output coil 37, the shifting of the magnetic flux in the core 34, first to its positive remanent point and then back to the negative remanent point, induces pulses of alternately positive and negative polarity. In accordance with the usual notation, a dot has been placed on one end of each of the windings 35, 36, and 37 to indicate the ends of the windings that are of the same polarity. The output winding 37 is connected to the output terminals 19 and 20, and a load impedance 40 is connected across the terminals 19 and 20 to form the output circuit 18. However, means are provided in the output circuit to suppress the output pulses of one polarity. In this case, a unidirectionally conductive or responsive element in the form of a diode 42 is connected in series with the output circuit. The illustrated diode 42 is polarized so as to carry positive output pulses to the output terminals while suppressing negative output pulses.

Figure 7:
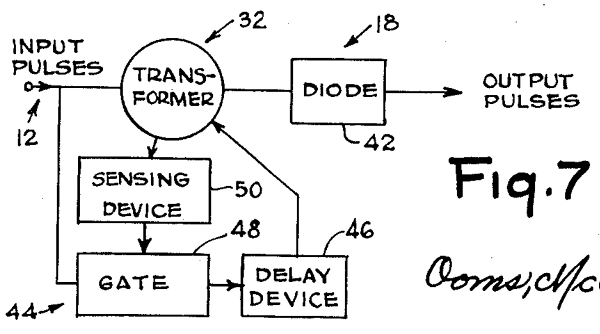
Fig. 7 is a generalized schematic diagram illustrating an arrangement in accordance with the present invention.

The general manner in which the gated reset pulses are developed may be presented to best advantage by referring to the block diagram of Fig. 7. This view shows the arrangement of the transformer 32, the input circuit 12, the output circuit 18 and the diode 42 in much the same manner as in Fig. 1, but in generalized form. In addition, the diagram of Fig. 7 shows a resetting circuit 44 adapted to develop reset pulses which are fed to the transformer 32 through a delay device 46. The resetting circuit 44 comprises a gating device 48 which has its input connected to the main input circuit 12. When the gate 48 is open, it feeds reset pulses to the delay device 46. Thus the reset pulses are derived from the input pulses. The action of the delay device 46 is such that each reset pulse occurs slightly later than the corresponding input pulse.

The gate 48 is opened and closed by a sensing device or element 50 which is responsive to the remanent state of the transformer 32. The sensing device 50 is shown as a separate block, but it will be understood that it may constitute a part of or be embodied in the gate 48.

As already indicated, it will be assumed that the input pulses are of such a magnitude and polarity as to shift the core 34 between its negative and positive remanent states. The magnitude and polarity of the reset pulses will be assumed to be such as to shift the core between its positive and negative remanent states. The action of the gate and the sensing device will be such that the gate will be closed if an input pulse finds the core in its negative remanant state, but will be opened if the core is found in the positive remanent state. In the latter case, the gating arrangement will develop a slightly delayed reset pulse so as to shift the core back to its remanent state after the effect of the input pulse has been dissipated. Thus, alternate input pulses are effective to shift the core between its negative and positive remanent states. The other input pulses find the core in its positive remanent state and hence are ineffective to cause such shifting action. Instead, the closely following reset pulses return the core to its negative remanent state.

The magnetic flip-flop of Fig. 1 might be provided with various resetting arrangements, but is illustrated as being equipped with a resetting circuit 52. In this case, the resetting circuit comprises a pulse transformer 54 having a magnetic core 56. Input and output coils 58 and 60 are wound on the core 56 so as to link the flux therein. In this case, the input coil 58 is connected in series with the coil 35 in the input circuit 12, so that the input current pulses are applied to the transformer 54. The magnetic material of the core 56 may be of the ordinary relatively low remanence type.

In combination with the input winding 36, the transformer 54 provides a combination gate and sensing device. It will be seen that leads 62 and 64 are connected between the output coil 60 and input coil 36, but that a capacitor 66 is connected into one of the leads, in this case the lead 64. The capacitor 66 acts as the delay device whereby the reset pulses are retarded slightly with respect to the corresponding input pulses. A diode 68 is shunted across the output coil 60 to effectively short-circuit or suppress pulses of one polarity, for a purpose to be made clear shortly.

Figure 3:
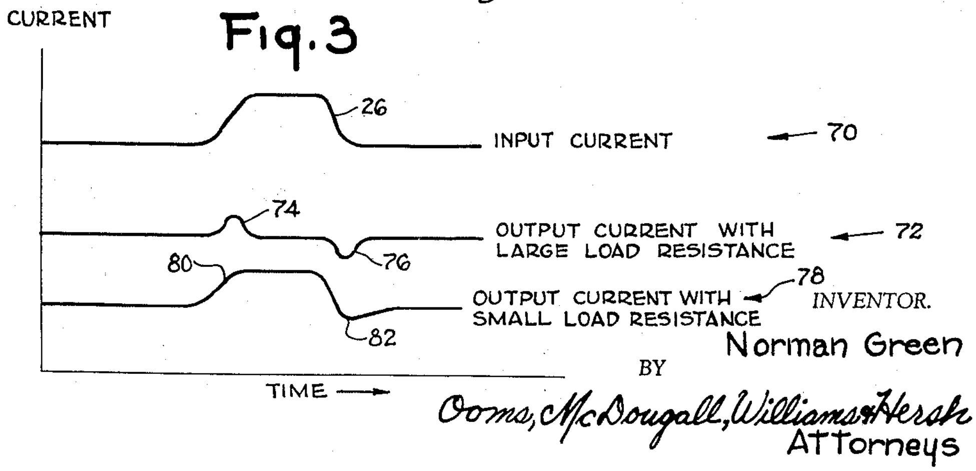
Fig. 3 shows waveform diagrams illustrating one aspect of the operation of the flip-flop device.

The gating action of the pulse transformer 54 may best be explained with reference to the oscillograms of Fig. 3. This view presents an oscillogram 70 which represents the waveform of the input pulses 26.

It will be apparent that the application of the input pulses 26 to the transformer 54 will generate pulses of current in the secondary coil 60. The waveform of the secondary pulses depends upon the impedance of the load connected to the secondary coil 60. If the load impedance is great, the rise and fall of each input pulse 26 tend to produce output current pulses of short duration and opposite polarity. The waveform for these conditions is illustrated by an oscillogram 72 in Fig. 3. It will be seen that a positive pulse 74 of brief duration and low magnitude is produced on the rise of the input pulse 26, while a similar negative pulse 76 is produced on the fall of the pulse 26.

When the impedance of the load connected to the secondary coil 60 is relatively low, the waveform of the output current tends to resemble the waveform of the input current. This is illustrated by the oscillogram 78 in Fig. 3. For this condition, the output current has a main positive pulse 80 with a waveform very similar to that of the input pulse 26. A small negative pulse or overshoot portion 82 is produced at the trailing end of the main pulse 80.

The capacitor 66 is made sufficiently large to offer a low impedance to the secondary current. When the bi-stable core 34 of the transformer 32 is in its negative remanent state, a relatively high impedance is reflected into the input coil 36. The high impedance reflected into the input coil 36 results from the large flux change which will occur in response to the application of positive magnetizing force. The steep slope of the hysteresis loop 38 between the points O and P indicates the existence of the high impedance condition. Roughly, the load impedance applied to the pulse transformer 54 is approximately equal to the value of the load impedance 40 multiplied by the square of the turns ratio between the input coil 36 and the output coil 37, modified somewhat by the presence of the input current pulse in the winding 35. The inductive reactance of the secondary coil 60, the turns ratio between the coils 36 and 37, and the value of the load impedance 40 are chosen so that the load impedance applied to the transformer 54 will be much larger than the inductive reactance of the secondary coil 60. The capacitor 66 will be charged to a small extent by the small positive pulse 74, produced during the rise of the input pulse 26. During the flat-topped portion of the input pulse 26, the capacitor will discharge through the coils 36 and 60. The discharge current is in a direction tending to reset the bi-stable core 34 to its negative remanent state, but the core 34 is not actually reset, but rather is transferred between its negative and positive remanent states by the input pulse in the coil 35, which occurs simultaneously with the discharge of the capacitor 66. Thus, the small pulse of reverse current caused by the capacitor discharge is swamped by the much greater magnetizing action of the input pulse in the winding 35. The capacitor discharge current is dissipated while the input pulse is still flowing in the winding 35. At the termination of the input pulse, the small inductive pulse 76, produced by the fall of the input pulse, is by-passed or short-circuited by the diode 68 and thus is ineffective to reset the bi-stable core 34. Operation of circuit is actually possible without the use of diode 68 although the circuit is more critical to adjust and will work over a more limited range of input pulse amplitudes.

At this point in the operation, the bi-stable core 34 is in its positive remanent state, represented by the point R in Fig. 2. Under this condition, the transformer 32 reflects a low load impedance to the transformer 54. This low impedance results from the small flux change that can be produced by the application of positive magnetizing force to the core. The existence of the low impedance is indicated by the small slope of the hysteresis loop 38 between the points R and P. The load impedance applied to the pulse transformer 54 under this condition is very low, being approximately equal to the direct current resistance of the input winding 36, plus the small impedance of the capacitor 66.

When the next input pulse is applied to the input coil 35, the core 34 is already in its positive remanent condition, with the result that no large change of flux can occur in the core due to the input pulse. It will be apparent that the input pulse merely increases the flux in the core to the value of $+B_M$, as the small hysteresis loop RPR is traversed. The maximum flux value $+B_M$ is only slightly greater than the remanent value $+B_R$, so that only a very small output pulse is produced. This small output pulse is indicated at 28 in the oscillogram 24 of Fig. 5.

Due to the small load impedance on the pulse transformer 54, the output current has the waveform indicated in the oscillogram 78. The large, long, positive pulse 80 charges the capacitor 66 to a considerable extent. Moreover, the charging current persists for virtually the entire duration of the input pulse. At the termination of the pulse 80, the capacitor 66 discharges through the coils 60 and 36. This discharge current is in a reverse or negative direction and hence is effective to reset the bi-stable core 34 to its negative remanent state. Since the discharge of the capacitor 66 occurs after the termination of the input pulse, the discharge current is fully effective to reset the core 34.

The resetting of the core 34 to its negative remanent state induces a negative pulse in the output coil 37, but the diode 42 prevents the transmission of the negative pulse to the load impedance 40. Thus, the only effect of the second input pulse is to produce the tiny output pulse 28, which for most practical purposes is negligible.

The flip-flop 10 is now restored to its original condition, with the bi-stable core 34 in its negative remanent state. Thus, the operational cycle of the circuit is completed, and the circuit is ready for the commencement of a new cycle. During the cycle, a single major output pulse is produced in response to the application of two input pulses. Thus, the flip-flop effectively provides an output at one-half the frequency of the input pulses.

Fig. 4 illustrates a flip-flop 90 which constitutes an elaboration of the flip-flop 10 which is shown in Fig. 1. Actually, the flip-flop 90 embodies the entire circuit arrangement of the flip-flop 10. All components of the flip-flop 10 are given the same reference characters in Fig. 4 as in Fig. 1. Moreover, the description directed to Fig. 1 applies to the corresponding portion of the flip-flop 90.

The flip-flop 90 of Fig. 4 differs from the flip-flop 10 of Fig. 1 by the addition of an output stage in the form of a magnetic shift register 92. The illustrated register is of the single-core type, utilizing a pulse transformer 94 with a bi-stable core 96 exhibiting a nearly rectangular hysteresis loop of the type illustrated in Fig. 2. Two input windings 97 and 98 and an output winding 99 are provided on the core 96 so as to link the flux therein. In this case, the polarity of the winding 98 is opposite to that of the winding 97, so that pulses of the same polarity in the respective input windings will tend to shift the core 96 in opposite directions between its two remanent states. A load impedance 102 is connected across the output coil 99, but a diode or the like 104 is connected in series therewith to suppress output pulses of one direction. In this case, the diode 104 is polarized to conduct positive pulses while suppressing negative pulses. It will be understood that other suppression arrangements may be employed.

The input coil 97 of the magnetic shift register is merely connected in series with the input coils 35 and 58. Thus the pulses of input current in the coil 97 are of the form indicated at 26 in Fig. 5. Each input pulse tends to shift the bi-stable core 96 to its positive remanent state.

A coupling circuit 106 is provided between the transformer 32 and the second input coil 98 of the transformer 94. In this case, the input circuit 106 comprises a capacitor 108 connected across the output terminals 19 and 20 of the flip-flop 10. The input coil 98 is also connected across the terminals 19 and 20, with a resistor 110 or other impedance connected in series therewith.

It will be recalled that alternate input pulses 26 produce a large positive output pulse 30 across the output terminals 19 and 20. The operation of the magnetic shift register 92 may best be explained by starting with an input pulse that does not produce an output pulse across the terminals 19 and 20. Such an input pulse finds the bi-stable core 96 in its negative remanent state. The positive input pulse shifts the bi-stable core 96 to its positive remanent state. This produces a large positive output pulse in the output coil 99. The diode 104 carries the output pulse to the load impedance 102.

The next input pulse finds the bi-stable core 96 in its positive remanent state. Thus, the input pulse can produce only a small increase in flux in the core 96, as the core traverses a small hysteresis loop such as that represented by the loop RPR in Fig. 2. Only a tiny positive output pulse is produced as represented by 28 in Fig. 5.

It will be recalled that the second input pulse is accompanied by a large positive pulse of output current from the flip-flop 10. This positive pulse charges the capacitor 108. Some of the output current also tends to flow through the winding 98, but this factor is small because of the provision of the series resistor 110. At the termination of the output pulse from the flip-flop 10, the capacitor 20 discharges through the series circuit comprising the coil 98 and the resistor 110. The discharge current is positive in polarity, but is effective to reset the bi-stable core 96 to its negative remanent state because of the reverse polarization of the input winding 98. The discharge of the capacitor 108 occurs after the termination of the input pulse, so that there is no interference with the resetting of the core 96. The resetting of the core induces a negative pulse in the output winding 99, but this pulse is suppressed by the diode 104.

The provision of the magnetic shift register 92 has the important advantage of increasing the output pulse width so that it is substantially the same as the input pulse width. Moreover, the addition of the magnetic shift register brings about a significant improvement in the output signal-to-noise ratio so that the large half frequency pulse is much greater in relation to unwanted portions of the output.

Figure 6:
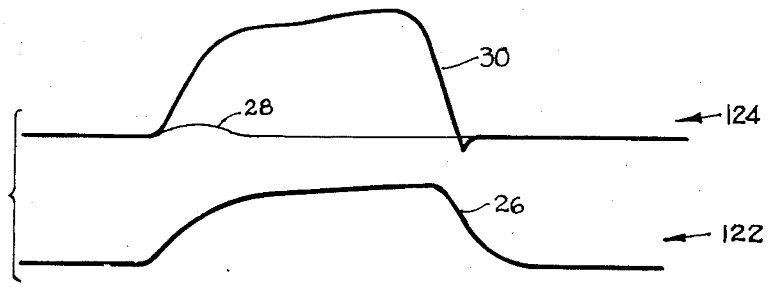
Fig. 6 illustrates oscillograms similar to those of Fig. 5, but with a faster time base sweep to spread out the oscillogram along the horizontal axis.

The oscillograms of Fig. 6 illustrate the relation of the output current to the input current. These oscillograms are actually the same as those in Fig. 5, but were made with a much faster time base so as to spread out the oscillograms along the horizontal axis. The input current is represented by an oscillogram 122, while the ouptut current is shown by an oscillogram 124. As in Fig. 5, the input pulses are designated 26, while the small and large output pulses are designated 28 and 30.

In the oscillogram of Fig. 6, the time base frequency is twice that of the input pulses so that the two input pulses 26 of Fig. 5 are superimposed. Since the input pulses 26 are identical, they are represented by a single trace. The output pulses 28 and 30 are also overlaid upon each other, but, being of different waveform, are clearly seen as separate traces. It will be observed that the major output pulse 30 is very similar in shape and width to the input pulse 26. The minor pulse 28, which is in the nature of noise, is extremely small in magnitude and narrow in width with respect to the major output pulse 30.

As already indicated, an amplitude ratio in the order of 10 to 1 has been achieved between the major and minor output pulses 30 and 28. Volt-time integral ratios in the order of 50 to 1 have been achieved. Thus, the energy of the major pulse 30 is very much greater than that of the minor pulse 28. For most practical purposes, the minor pulse 28 is negligible, so that the output may be considered to be at one-half the frequency of the input pulses.

It will be recognized that the transformers and all of the other components of the illustrated flip-flops are inherently sturdy and reliable. No vacuum tubes, transistors or other fragile devices are needed. There is no need to provide any direct or alternating current power supply. The flip-flop operates from a single source of pulses applied to a single pair of input terminals. One or more output circuits may be provided, as desired.

With all of these and other advantages, the magnetic flip-flops are extremely compact and economical.

Various other modifications, alternative constructions and equivalents may be employed without departing from the true spirit and scope of the invention as exemplified in the foregoing description and defined in the following claims.

I claim:

1. A magnetic flip-flop device, comprising, in combination, a first magnetic circuit made of material having high magnetic remanence and exhibiting a nearly rectangular hysteresis loop and thereby having first and second states of passive magnetic stability, an input circuit for receiving a train of repetitive substantially unidirectional input pulses, an input winding on said magnetic circuit and connected to said input circuit for supplying magnetizing force to said magnetic circuit in a direction to shift said magnetic circuit between said first and second states, an output circuit including an output winding on said magnetic circuit for deriving an output pulse in response to the change in said magnetic circuit between said first and second states, a pulse transformer including a second magnetic circuit having input and output coils thereon, said second magnetic circuit being made of material having low magnetic remanence, said input coil being connected to said input circuit to receive input pulses therefrom, a reset winding on said magnetic circuit, a capacitor, a reset circuit connecting said capacitor in a series loop with said output coil of said transformer and said reset winding, said reset coil reflecting a relatively high impedance to said output coil when said magnetic circuit is in said first state while reflecting a relatively low impedance when said magnetic circuit is in said second state, said output coil thereby being effective to charge said capacitor to a large extent when said magnetic circuit is in said second state while being effective to charge the capacitor to only an insignificant extent when said magnetic circuit is in said first state, said capacitor being operative to discharge through said reset winding and thereby being effective to reset said magnetic circuit from said second to said first state after the termination of the input pulse effective to charge said capacitor, the discharge of said capacitor thereby producing a delayed reset pulse, a diode connected across said output coil to suppress the generation of pulses having a direction opposite to the reset pulses, said magnetic circuit thereby being shifted between said first and said second states by one input pulse while being returned to said first state in response to the next input pulse, and means in said output circuit for suppressing output pulses due to the return of said magnetic circuit to said first state.

2. A magnetic flip-flop device, comprising, in combination, a magnetic circuit made of material having high magnetic remanence and exhibiting a nearly rectangular hysteresis loop and thereby having first and second states of passive magnetic stability, an input circuit for receiving a train of repetitive substantially undirectional input pulses, an input winding on said magnetic circuit and connected to said input circuit for supplying magnetizing force to said magnetic circuit in a direction to shift said magnetic circuit between said first and second states, an output circuit including an output winding on said magnetic circuit for deriving an output pulse in response to the change in said magnetic circuit between said first and second states, a pulse transformer including a second magnetic circuit having input and output coils thereon, said second magnetic circuit being made of material having low magnetic remanence, said input coil being connected to said input circuit to receive input pulses therefrom, a reset winding on said magnetic circuit, a capacitor, a reset circuit connecting said capacitor in a series loop with said output coil and said reset winding, said reset coil reflecting relatively high impedance to said output coil when said magnetic circuit is in said first state while reflecting a relatively low impedance when said magnetic circuit is in said second state, said impedance being relatively high and low with respect to the impedance of said output coil, said output coil thereby being effective to charge said capacitor to a large extent when said magnetic circuit is in said second state while being effective to charge the capacitor to only an insignificant extent when said magnetic circuit is in said first state, said capacitor being operative to discharge through said reset winding and thereby being effective to reset said magnetic circuit from said second to said first state after the termination of the input pulse effective to charge said capacitor, the discharge of said capacitor thereby producing a delayed reset pulse, a diode connected across said output coil to suppress the generation of pulses having a direction opposite to the reset pulses, said magnetic circuit thereby being shifted between said first and said second state by one input pulse while being returned to said second state in response to the next input pulse, and a diode in series with said output circuit for suppressing output pulses due to the return of said magnetic circuit to said first state.

3. A magnetic flip-flop device, comprising, in combination, a first magnetic circuit made of material having high magnetic remanence and exhibiting a nearly rectangular hysteresis loop and thereby having first and second states of passive magnetic stability, an input circuit for receiving a train of repetitive substantially unidirectional input pulses, an input winding on said magnetic circuit and connected to said input circuit for supplying magnetizing force to said magnetic circuit in a direction to shift said magnetic circuit between said first and second states, an output circuit including an output winding on said magnetic circuit for deriving an output pulse in response to the change in said magnetic circuit between said first and second states, a pulse transformer including a second magnetic circuit having input and output coils thereon, said second magnetic circuit being made of material having low magnetic remanence, said input coil being connected to said input circuit to receive input pulses therefrom, a reset winding on said magnetic circuit, a capacitor, a reset circuit connecting said capacitor in a series loop with said output coil of said transformer and said reset winding, said reset coil reflecting a relatively high impedance to said output coil when said magnetic circuit is in said first state while reflecting a relatively low impedance when said magnetic circuit is in said second state, said output coil thereby being effective to charge said capacitor to a large extent when said magnetic circuit is in said second state while being effective to charge the capacitor to only an insignificant extent when said magnetic circuit is in said first state, said capacitor being operative to discharge through said reset winding and thereby being effective to reset said magnetic circuit from said second to said first state after the termination of the input pulse effective to charge said capacitor, the discharge of said capacitor thereby producing a delayed reset pulse, a diode connected across said output coil to suppress the generation of pulses having a direction opposite to the reset pulses, said magnetic circuit thereby being shifted between said first and said second states by one input pulse while being returned to said first state in response to the next input pulse, means in said output circuit for suppressing output pulses due to the return of said magnetic circuit to said first state, a magnetic shift register having first and second conditions of stability, said register having an output element and first and second input elements, means connecting said first input element to said input circuit for receiving the train of pulses therein, means connecting said second input element to said output circuit means, the input pulses from said input circuit being in a direction to shift said register between said conditions in one direction, the output pulses from said output circuit means being effective to shift said register between said conditions in the opposite direction, said register thereby being operative to shift alternately between said conditions with successive input pulses, said output element including means for deriving pulses of alternate polarity in response to the alternate shifting of said register between said conditions, and means in said output element for suppressing the pulses of one polarity.

References Cited in the file of this patent

UNITED STATES PATENTS

| | | |
|---|---|---|
| 2,652,501 | Wilson | Sept. 15, 1953 |
| 2,713,675 | Schmidt | July 19, 1955 |
| 2,847,659 | Kaiser | Aug. 12, 1958 |